3,076,801
THIAZOLO-ANDROSTANES

Albert Bowers and John Edwards, Mexico City, Mexico, assignors, by mesne assignments, to Syntex Corporation, a corporation of Panama
No Drawing. Filed Aug. 3, 1961, Ser. No. 128,948
10 Claims. (Cl. 260—239.5)

The present invention relates to novel cyclopentanophenanthrene compounds and to a process for the production thereof.

More particularly the present invention relates to novel thiazolo (4',5';2,3)-androstan-17β-ol derivatives.

The novel compounds of the present invention which are potent anabolic-androgenic agents with a particularly favorable anabolic-androgenic ratio, possess anti-estrogenic, anti-gonadotropic, and blood cholesterol lowering activities, depress the action of the pituitary gland and exhibit anti-fibrillatory action, are represented by the following formula:

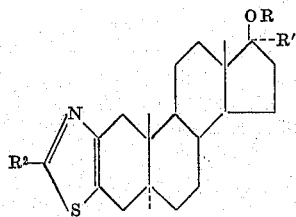

In the above formula, R represents a hydrogen or a hydrocarbon carboxylic acyl group containing less than 12 carbon atoms; $R^1$ may be hydrogen or an alkyl, alkenyl, or alkinyl group of up to 8 carbon atoms, and $R^2$ represents hydrogen, lower alkyl or an aryl or aralkyl group containing less than 8 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

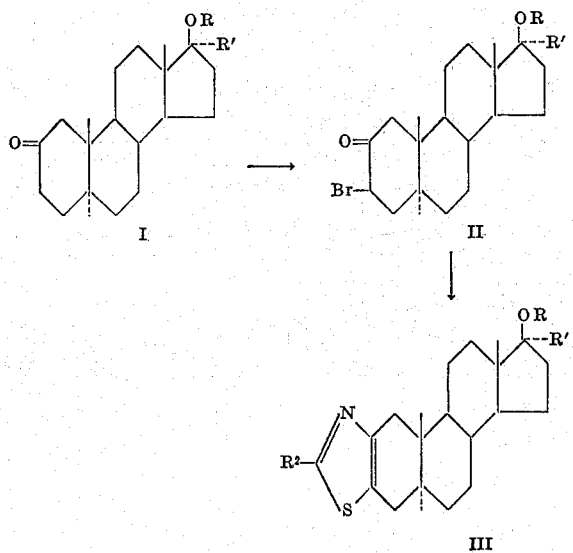

In the above formulas, R, $R^1$ and $R^2$ have the same meaning as previously set forth.

In practicing the process outlined above, the starting androstan-17β-ol-2-one derivative (I) (obtained as described in the copending U.S. patent application Serial No. 128,362, filed August 1, 1961) is treated with 1.1 mol equivalents of bromine, in the presence of hydrogen bromide in a suitable solvent such as acetic acid affording the corresponding 3β-bromo-2-ketone derivative (II).

Treatment of this derivative with a thioamide as for example thioformamide, thioacetamide, thiobenzamide, or phenylthioacetamide, in a suitable solvent such as ethanol, under reflux conditions for a period of time of the order of 24 hours affords the corresponding thiazolo (4',5';2,3)-androstan-17-ol derivative.

The following specific examples serve to illustrate but are not intended to limit the scope of the present invention:

Example I

A solution of 3 g. of androstan-17β-ol-2-one in 75 cc. of acetic acid was treated with a few drops of an acetic solution of hydrogen bromide and then dropwise and with stirring with a solution of 1.1 molar equivalents of bromine in acetic acid. When all the bromine had been consumed the reaction mixture was poured into water. The formed precipitate was filtered off, washed well with water and dried under vacuum. Crystallization of the crude product from ether-hexane afforded pure 3β-bromo-androstan-17β-ol-2-one.

When applying the same technique to androstan-17β-ol-2-one-17-acetate, and androstan-17β-ol-2-one-17-benzoate, there were correspondingly obtained 3β-bromo-androstan-17β-ol-2-one-17-acetate and 3β-bromo-androstan-17β-ol-2-one-17-benzoate.

Example II

17α-methyl-androstan-17β-ol-2-one, 17α-methyl-androstan-17β-ol-2-one-17-propionate and 17α-methyl-androstan-17β-ol-2-one-17-cyclopentylpropionate were treated following the technique described in Example I, furnishing 3β - bromo - 17α - methyl - androstan - 17β - ol - 2 - one, 3β - bromo - 17α - methyl - androstan - 17β - ol - 2 - one-17-propionate, and 3β-bromo-17α-methyl-androstan-17β-ol-2-one-17-cyclopentylpropionate.

Example III

When applying the procedure described in Example I to 17α-vinyl-androstan-17β-ol-2-one, 17α-vinyl-androstan-17β-ol-2-one-17-acetate, 17α-vinyl-androstan-17β-ol-2-one-17-caproate, there were correspondingly obtained 3β-bromo-17α-vinyl-androstan-17β-ol-2-one, 3β-bromo-17α-vinyl-androstan-17β-ol-2-one-17-acetate, and 3β-bromo-17α-vinyl-androstan-17β-ol-2-one-17-caproate.

Example IV

Using the same conditions described in Example I, there were treated 17α-ethinyl-androstan-17β-ol-2-one, 17α - ethinyl - androstan - 17β - ol - 2 - one - 17 - propionate, and 17α-ethinyl-androstan-17β-ol-2-one-17-cyclopentylpropionate, thus affording respectively 3β-bromo-17α - ethinyl - androstan - 17β - ol - 2 - one, 3β - bromo - 17α - ethinyl - androstan - 17β - ol - 2 - one - 17 - propionate, and 3β-bromo-17α-ethinyl-androstan-17β-ol-2-one-17-cyclopentylpropionate.

Example V

A solution of 2 g. of 3β-bromo-androstan-17β-ol-2-one and 2 g. of thioformamide in 100 cc. of ethanol was refluxed for 24 hours. Then the greater part of the solvent was removed and water added. The resulting mixture was washed with ethyl acetate and then made strongly alkaline by addition of 10% aqueous potassium hydroxide. The resulting precipitate was filtered off, washed with water and dried on the steam bath. Crystallization from acetone-hexane afforded thiazolo (4′,5′;2,3)-androstan-17β-ol.

When applying the same technique to 3β-bromo-androstan-17β-ol-2-one-17-acetate, and 3β-bromo-androstan-17β-ol-2-one-17-benzoate, there were correspondingly obtained thiazolo (4′,5′;2,3)-androstan-17β-ol 17-acetate, and thiazolo (4′,5′;2,3)-androstan-17β-ol-benzoate.

*Example VI*

There were treated by the above technique 3β-bromo-17α-methyl-androstan-17β-ol-2-one, 3β-bromo-17α-methyl-androstan-17β-ol-2-one-17-propionate, and 3β-bromo-17α-methyl-androstan - 17β - ol-2-one-17-cyclopentylpropionate, giving respectively thiazolo (4′,5′;2,3)-17α-methyl-androstan-17β-ol, thiazolo (4′,5′;2,3)-17α-methyl-androstan-17β-ol-17-propionate, thiazolo (4′,5′;2,3)-17α-methyl-androstan-17β-ol-17-cyclopentylpropionate.

*Example VII*

Following the technique described in Example V were treated 3β-bromo - 17α - vinyl-androstan-17β-ol-one, 3β-bromo-17α-vinyl-androstan-17β-ol-2-one-17 - acetate and 3β - bromo-17α-vinyl-androstan-17β-ol-2-one-17-caproate, affording correspondingly thiazolo (4′,5′;2,3)-17α-vinyl-androstan - 17β - ol; thiazolo (4′,5′;2,3)-17α-vinyl-androstan-17β-ol-17-acetate and thiazolo (4′,5′;2,3) 17α-vinyl-androstan-17β-ol-17-caproate.

*Example VIII*

Following the technique described in Example V were treated 3β - bromo-17α-vinyl-androstan-17β-ol-2-one, 3β-bromo - 17α - ethinyl - androstan-17β-ol-2-one-17-propionate, and 3β-bromo-17α-ethinyl-androstan-17β-ol-2-one-17-cyclopentylpropionate, furnishing respectively thiazolo (4′,5′;2,3)-17α-ethinyl-androstan-17β-ol, thiazolo (4′,5′; 2,3)-17β-ethinyl-androstan-17β-ol-17-propionate, and thiazolo (4′,5′;2,3) - 17α-ethinyl-androstan-17β-ol-17-cyclopentylpropionate.

*Example IX*

Following exactly the same techniques described in Example V except that thioformamide was substituted by thioacetamide, there were treated 3β-bromo-androstan-17β - ol - 2 - one, 3β-bromo-androstan-17β-ol-2-one-17-acetate and 3β-bromo-androstan-17β-ol-2-one-17-benzoate, affording correspondingly 2′-methyl-thiazolo (4′,5′; 2,3) androstan-17β-ol, 2′-methyl-thiazolo (4′,5′;2,3)-androstan-17β-ol-17-acetate, and 2′-methyl-thiazolo (4′,5′; 2,3)-androstan-17β-ol-17-benzoate.

*Example X*

In accordance with Example IX, there were treated 3β-bromo - 17α - methyl-androstan-17β-ol-2-one, 3β-bromo-17α-methyl-androstan-17β-ol-2-one - 17 - propionate, and 3β-bromo - 17α - methyl-androstan-17β-ol-2-one-17-cyclopentylpropionate, thus affording respectively 2′-methyl-thiazolo (4′,5′;2,3) - 17α - methyl - androstan - 17β - ol, 2′ - methyl - thiazolo (4′,5′;2,3)-17α-methyl-androstan-17β-ol-17-propioinate, and 2′-methyl-thiazolo (4′,5′;2,3)-17α-methyl-androstan-17β-ol-17-cyclopentylpropionate.

*Example XI*

Following the method of Example IX were treated 3β-bromo-17α-vinyl-androstan-17β-ol-2-one, and 3β-bromo-17α-ethinyl-androstan-17β-ol-2-one affording respectively 2′-methyl-thiazolo (4′,5′;2,3)-17α-vinyl-androstan-17β-ol and 2′-methyl-thiazolo (4′,5′;2,3)-17α-ethinyl-androstan-17β-ol.

*Example XII*

3β-bromo-androstan-17β-ol-2-one, 3β-bromo-androstan-17β-ol-2-one 17-acetate and 3β-bromo-androstan-17β-ol-2-one-17-benzoate were treated following the technique described in Example V except that thioformamide was substituted by thiobenzamide thus affording respectively 2′-phenyl-thiazolo (4′,5′;2,3)-androstan-17β-ol, 2′-phenyl-thiazolo (4′,5′;2,3)-androstan-17β - ol - 17 - acetate, and 2′-phenyl-thiazolo (4′,5′;2,3)-androstan-17β-ol-17-benzoate.

*Example XIII*

In accordance with Example XII were treated 3β-bromo - 17α - methyl-androstan-17β-ol-2-one, 3β-bromo-17α - methyl - androstan - 17β - ol - 2 - one-17-propionate, and 3β-bromo - 17α - methyl-androstan-17β-ol-2-one-17-cyclopentylpropionate affording correspondingly 2′-phenyl-thiazolo (4′,5′;2,3) - 17α - methyl-androstan-17β-ol, 2′ - phenyl - thiazolo (4′,5′;2,3) - 17α-methyl-androstan-17β-ol-17-propionate, and 2′-phenyl-thiazolo (4′,5′;2,3)-17α-methyl-androstan-17β-ol-17-cyclopentylpropionate.

*Example XIV*

Following the method of Example XII, there were treated 3β-bromo-17α-vinyl-androstan-17β-ol-2-one, and 3β - bromo-17α-ethinyl-androstan-17β-ol-2-one, affording correspondingly 2′-phenyl-thiazolo (4′,5′;2,3)-17α-vinyl-androstan-17β-ol, and 2′-phenyl-thiazolo (4′,5′;2,3)-17α-ethinyl-androstan-17β-ol.

We claim:
1. A compound of the following formula:

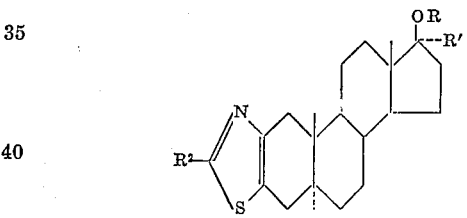

wherein R is a member of the group consisting of hydrogen and a hydrocarbon carboxylic acyl group of less than 12 carbon atoms; $R^1$ is selected from the group consisting of hydrogen, an alkyl group, an alkenyl group, and an alkynyl group of less than 8 carbon atoms, and $R^2$ is selected from the group consisting of hydrogen, lower alkyl, an aryl group and an aralkyl group containing less than 8 carbon atoms.

2. Thiazolo(4′,5′;2,3)-androstan-17β-ol.
3. Thiazolo(4′,5′;2,3)-androstan-17β-ol-17-acetate.
4. Thiazolo(4′,5′;2,3)-17α-methyl-androstan-17β-ol.
5. 2′ - methyl - thiazolo(4′,5′;2,3) - 17α - methyl-androstan-17β-ol-17-propionate.
6. 2′ - phenyl - thiazolo(4′,5′;2,3) - 17α - methyl-androstan-17β-ol-17-cyclopentylpropionate.
7. Thiazolo(4′,5′;2,3)-17α-vinyl-androstan-17β-ol.
8. Thiazolo(4′,5′;2,3)-17α-ethinyl-androstan-17β-ol.
9. 2′ - methyl - thiazolo(4′,5′;2,3) - 17α - vinyl - androstan-17β-ol.
10. 2′ - phenyl - thiazolo(4′,5′;2,3) - 17α - ethinyl-androstan-17β-ol.

References Cited in the file of this patent
UNITED STATES PATENTS
2,813,859    Korman _____ Nov. 19, 1957